J. L. HILLER.
BEARING.
APPLICATION FILED JAN. 25, 1911.

1,157,939.

Patented Oct. 26, 1915.
3 SHEETS—SHEET 1.

Witnesses
H. A. Rohnert
J. P. Tarbox

Inventor
Joseph L. Hiller

By Meyers, Cushman & Rea
Attorneys

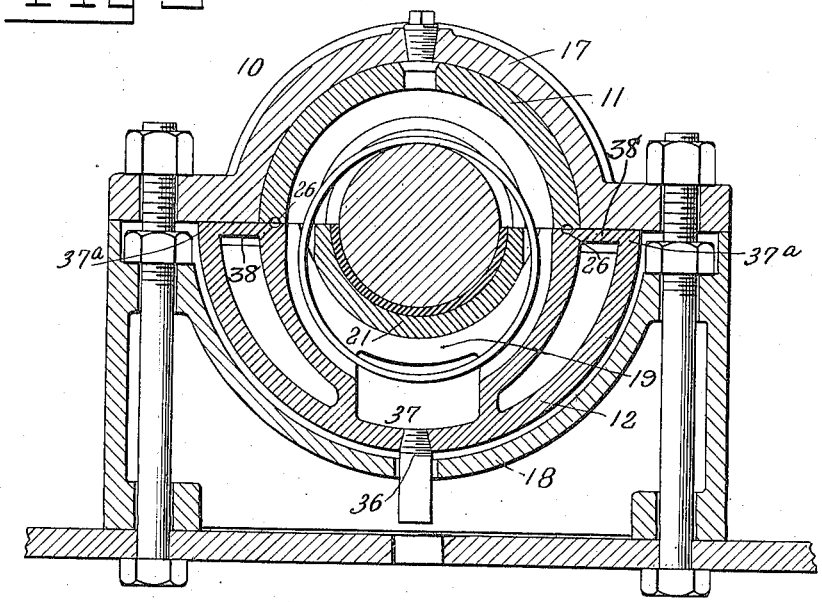
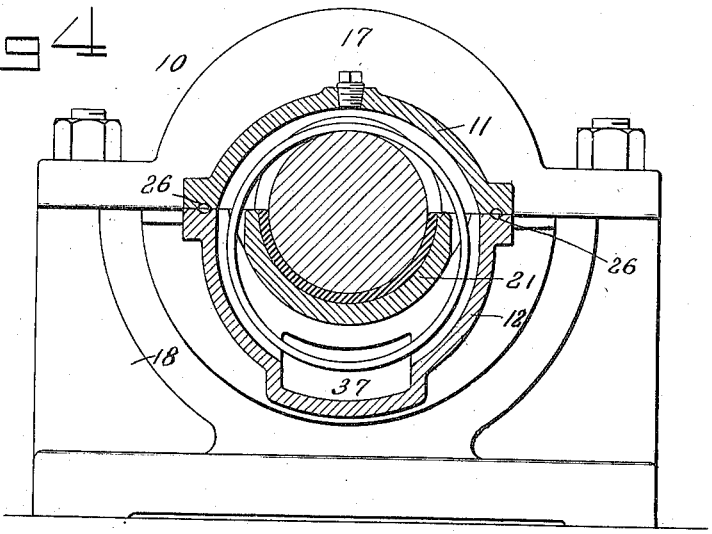

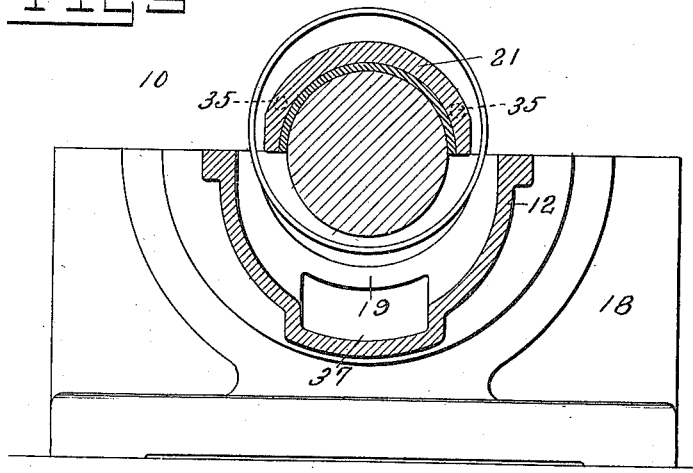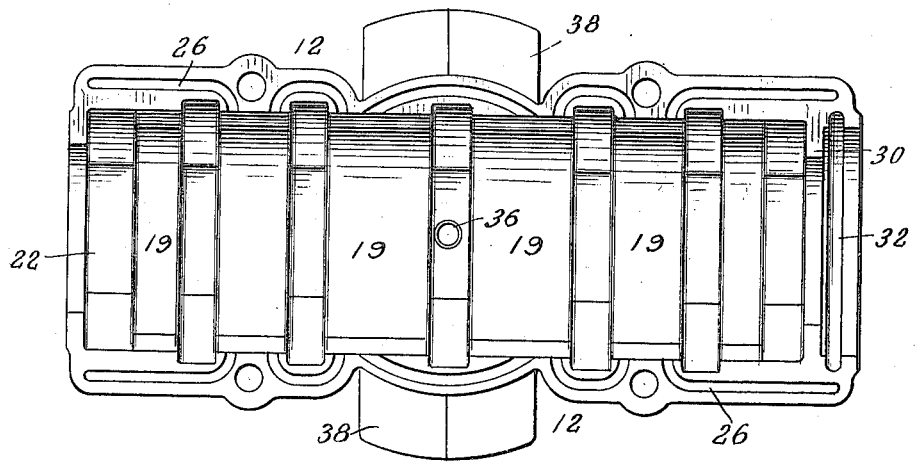

UNITED STATES PATENT OFFICE.

JOSEPH L. HILLER, OF MATTAPOISETT, MASSACHUSETTS.

BEARING.

1,157,939.  Specification of Letters Patent.  Patented Oct. 26, 1915.

Application filed January 25, 1911. Serial No. 604,621.

*To all whom it may concern:*

Be it known that I, JOSEPH L. HILLER, a citizen of the United States, residing at Mattapoisett, in the county of Plymouth and State of Massachusetts, have invented new and useful Improvements in Bearings, of which the following is a specification.

My invention consists of an improved bearing of the ring oiling ball and socket type, particularly adapted for use in connection with machines doing heavy work at high speed, and for use under unfavorable working conditions where careless attendance prevails.

In ball and socket bearings of the oil ring type heretofore made, trouble has been had with the bearings of large size owing to inability to properly handle the oil rings without moving the shaft from the bearings or vice versa when it was desired to take out an oil ring or other parts of the bearings. In many large machines it is impracticable to move the shaft from the bearings, the bearings from the shaft, or to jack the shaft out of line. In cases where it is practicable much time is lost. Attempts have been made to adapt the bearings to these conditions but in many instances the result has been impaired lubrication, decreased bearing surface, and strength, and a more or less open structure which admits dust and foreign matter to the bearings. One of the chief reasons for these difficulties and disadvantages has been the lack of sufficient space for manipulation and lubrication.

The aim of my invention is to produce a bearing adapted especially for heavy use in which all of these difficulties are avoided, and disadvantageous features eliminated, the bearing while admitting ready manipulation of its parts giving at the same time perfect lubrication.

In the accompanying drawings, I have shown one embodiment of my invention.

Figure 1:
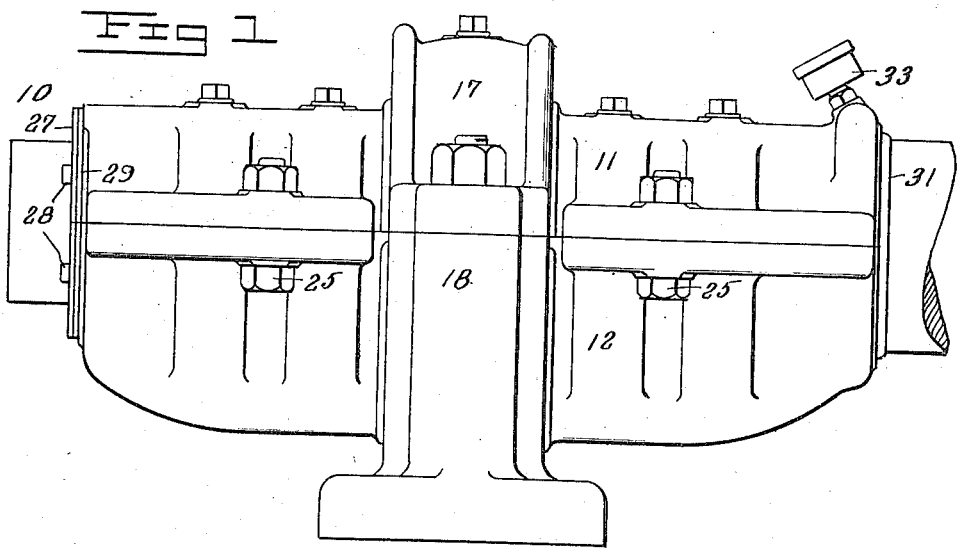
Figure 2:
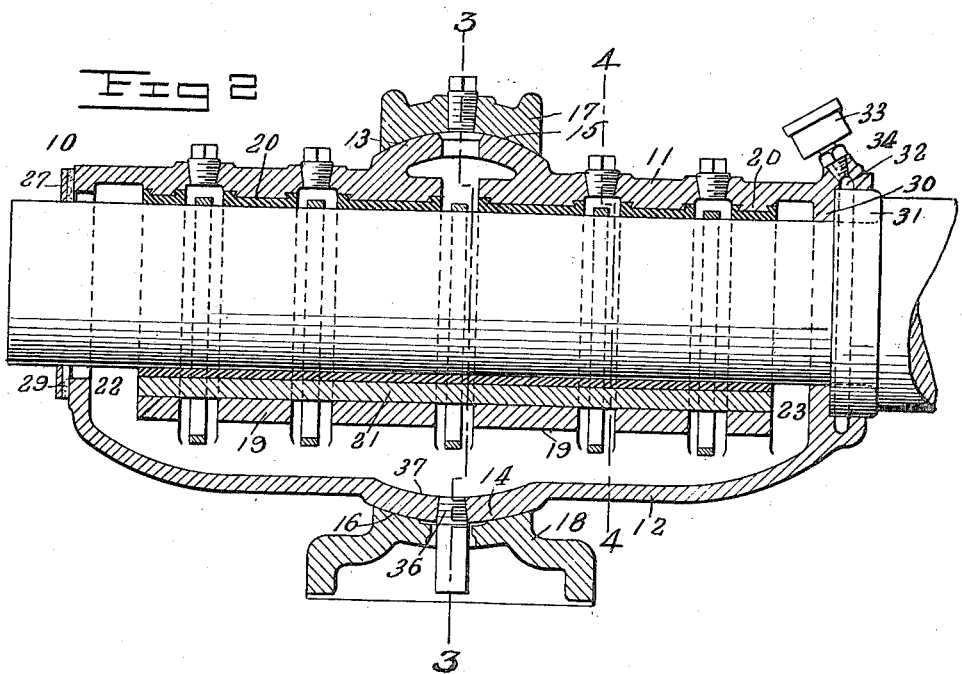

Of the drawings Figure 1 is a side elevation of the bearing and its support. Fig. 2 is a longitudinal vertical section of the same showing the shaft in place in the bearing; Fig. 3 is a transverse section through the center of the bearing on line 3—3 of Fig. 2, Fig. 4 is a transverse section on line 4—4 of Fig. 2 showing the parts in their normal operating positions, Fig. 5 is a transverse section on the same line 4—4 showing the parts in a position in which the rings may be removed prior to the removal of a liner, and Fig. 6 is a top plan view of the lower cap or half of the bearing.

The body of the bearing 10 is composed of two halves 11 and 12. These halves of the bearing are provided respectively with ball or spherical surfaces 13 and 14 about their middle adapted to bear on corresponding surfaces 15 and 16 formed respectively in a bearing cap 17 and bearing support or pillow block 18. The bearing proper 10 is of considerably greater length than the cap and pillow block are wide, the ends of the bearing projecting a considerable distance on each side of the support 18. As is usual in bearings of this type the cap 17 and block 18 are bolted together. By virtue of the ball and socket, the body of the bearing may move with respect to the support in response to abnormal strain and normal flexing of the shaft.

Instead of making the radius of the spherical surfaces 13 and 14 of the bearings of the same radius as is usual, I form the surface 14 of the lower half of the bearing on a larger radius, but nevertheless form the surfaces concentric with each other. The lower half 12 of the body of the bearing I make correspondingly larger, the enlargement being made particularly in depth as is clearly shown in Fig. 3.

Within the body of the bearing, the bearing surface is formed by ribs 19 on the member 12, and 20 on the member 11. These ribs are cast integrally with the members 11 and 12 respectively, and the ribs 19 pass across the body 12 above the bottom, being connected to the body only at their ends. The ribs of the upper half are babbitted as clearly shown for contact with the shaft. The ribs 19 of the lower half are not babbitted, but are machined for bearing a liner 21 placed between them and the shaft, and which in turn is babbitted for properly bearing the shaft. This liner is of a length equal to the distance between the outside ends of the end most ribs. The adjacent edges of the lower half of the bearing, and the liner are beveled or chamfered on arcs of circles as shown, this chamfering being done throughout the length of the liner on each side. Beyond the ends of the liner are provided spaces 22 and 23, the space 22 being somewhat larger than the space 23. These spaces are formed by interiorly enlarging the members 11 and 12, the enlargement of the member 12 extending well down into the depth of the member. A solid oil ring is placed around the shaft in each space between two adjacent ribs 19 and 20. These rings are of such diameter that when they rest on top of the shaft they hang at the bottom well down below the ribs 19 of the lower half of the bearing.

The two halves 11 and 12 of the bearing are bolted together by bolts 25. On the abutting faces of the halves 11 and 12 are formed oil grooves 26 (see Fig. 6 and Fig. 3). The oil grooves 26 of the upper and lower halves 11 and 12 register, and the ends of the grooves adjacent the bolts 25 are turned inwardly and enter the interior of the bearing. The outward end of the bearing is closed by a plate 27 secured to the end of the body by screws 28 and making a tight joint therewith by reason of the interposed ring-packing 29. One end of the bearing is provided with means for taking up the thrust of the shaft. This means comprises an interior flange 30 formed well within the end of the bearing and having its outer face finished to form a square shoulder. On the shaft is provided a collar 31 adapted to engage this shoulder. The projecting ends of the bearing halves 11 and 12 are bored to make a reasonably close fit with the circular periphery of the collar 31. An interior groove 32 is formed in these close fitting ends, and a grease cup 33 is adapted to force grease through a channel 34 into this groove. By virtue of this latter construction, the thrust bearing between the shoulder 30 and the collar 31 is well lubricated, while at the same time the grease in the groove 30 constitutes a most effective seal against the entry of any foreign matter whatsoever into the bearing. On the other end of the bearing the plate 27 with its packing 29 also seals the bearing against the entry of foreign matter at that point. The halves 11 and 12 of the bearing being bolted together, if the abutting edges of the halves are machined properly there is little opportunity for any foreign matter to enter at this point. Thus it will be seen that the bearing is altogether sealed up against the entry of foreign matter. The registering grooves 26 on the abutting edges of the halves serve a two-fold purpose, first to catch any foreign matter which may enter through irregularity in the fitting of the edges of the halves, and secondly to intercept all oil which may seek to flow to the exterior of the bearing by capillary action between the surfaces. The capillary action is effectively broken by the grooves, and the oil caught in the grooves flows through the ends of the grooves back into the body of the bearing.

At any time that it is desired the top half 11 of the bearing may be removed, by simply removing the top cap 17 of the support and the bearing inspected. Furthermore the liner 21 may be removed without removing the lower half of the bearing from the shaft, or removing the shaft from the bearing. In fact the bearing and the shaft do not have to be disturbed in any way whatsoever. It is necessary only to take a spanner wrench adapted to engage in holes 35 in the ends of the bottom liner after the top half 11 has been removed, and rotate the liner until it takes the position shown in Fig. 5 at the top of the bearing. Thereafter, by virtue of the chamfered edges of the liner and the lower half of the bearing, the rings may be most readily moved longitudinally of the shaft to the end space 22 or the end space 23, the lower or bottom sides of the rings passing the tops of the ribs in the lower half 12. Of course the rings must be moved successively, the endmost ones first and the inner ones last. Five rings are shown as provided in this bearing, one of the rings being located at the center of the bearing. Three of these rings may be accommodated in one space 22, and two of them may be accommodated in the other space 23. By virtue of the increased depth of the bearing, these rings may rest upon the shaft at this point. After the rings have been removed in this manner, the liner can be lifted from the top of the shaft in the same manner as was the top half of the bearing. Thus new rings and new liners may be placed in the bearing without disturbing its relation to the shaft. In addition to providing this storage space for the rings, and making possible the ready removal of liners employed on the bottom of the bearing, the increased space provided by the increased size of the lower half 12 of the bearing, makes it possible to use larger oil rings, and gives space for a relatively large oil reservoir. As shown in Fig. 2 the oil reservoir extends the full length of the bearing, and is open throughout its length, being unobstructed by any ribs or other projections. The floor of the reservoir tapers downwardly toward the middle where it is lowest; a drainage passageway 36 passing from a central depression 37 through the support 18. An opening in the support 18 is made for this passageway, and the passageway is normally closed by a suitable valve or cap (not shown). A free and unobstructed circulation of a large body of oil is thus assured in the bearing. The lower half 12 of the bearing being of larger radius than the upper half 11 also, and there being but a single liner used, that liner is prevented from rotating from its bottommost position, by engagement of its upper edges with the lower edges of the ribs 20 of the upper half 11 of the bearing. Furthermore, also the body of the bearing as a whole is prevented from rotating in the socket formed by the support 18 and cap 17 by reason of the fact that its edges 37ª of the lower half project laterally beyond the edges of the upper half 11. These laterally projecting edges are engaged by the lower faces of the cap 17, and rotation of the bearing thus cannot take place. For all of these facts however, the bearing is free to move about the ball and socket as a center there being no hindrance to this movement since both spherical ball surfaces 13 and 14, are formed from the same center which center is on the axis line of the shaft, through which axis the plane of division of the halves 11 and 12 of the bearing passes. In order to prevent possible interference from the lower faces of the cap 17, the top surfaces 38, of member 12, are sloped downwardly and outwardly from a central line, this slope preferably taking the form of the plane as shown. There is thus no interference when oscillation of the bearing takes place in a vertical plane. The laterally projecting portions 37ª of the lower half 12 of the bearing might be so curved instead of the lower faces of the cap 17.

While I have described the best form of my invention now known to me, I desire to have it understood that any modifications may be made without departing from its generic spirit. I desire to cover all such modifications in the annexed claims.

What I claim is:—

1. A ball and socket bearing comprising a two-part journal box having spaced supporting surfaces in its lower part providing annular spaces therein, a semi-circular liner seated on said supporting surfaces, solid oil rings in said annular spaces adapted to encircle a shaft rotatable in said liner, and oil ring spaces at the ends of the bearing, said liner being rotatable from its seat when the top of the journal box has been removed to permit the withdrawal of said liner and allow the oil rings to be moved into the spaces at the ends of the bearing.

2. A ball and socket bearing comprising a two-part journal box having spaced supporting surfaces in its lower part providing annular spaces therein, a semi-cylindrical liner seated on the semi-circular faces of said supporting surfaces, solid oil rings in said annular spaces adapted to encircle the liner, and a shaft rotatable in said liner and bearing upon said shaft, and oil ring spaces surrounding the shaft at each end of the box, the space at one end being larger than the corresponding space at the opposite end, said liner being rotatable from its seat when the top of the journal box has been removed to permit the withdrawal of said liner and allow the oil rings to be moved into the spaces at the ends of the bearing.

3. A ball and socket bearing comprising a two-part journal box having longitudinally spaced supporting surfaces in its lower part forming annular spaces therein, a semi-cylindrical liner seated on the semi-circular faces of said supporting surfaces, solid oil rings in said annular spaces adapted to encircle said liner, and a shaft rotatable in said liner and bearing upon said shaft, said journal box having an interior enlargement between the supporting surfaces and one end of the box adapted to receive the oil rings while the same are on the shaft, said liner being rotatable from its seat when the top of the journal box has been removed to permit the withdrawal of said liner, and allow the oil rings to be moved longitudinally of the shaft into said enlargement.

4. A bearing comprising a journal box made in two parts, and having internal separated bearing surfaces providing annular spaces, and solid oil rings on a shaft arranged in the bearing and disposed in the spaces between the bearing surfaces, said surfaces being provided with an unbroken liner adapted to be rotated through substantially 180 degrees, the adjoining edges of the bearing surfaces and the liner being chamfered to permit the passage of the oil rings along the shaft between the liner and the surfaces after the liner has been rotated to the top of the bearing.

5. A bearing comprising a journal box made in two parts and provided with internal bearing surfaces longitudinally spaced apart to provide annular spaces, oil rings carried upon a shaft and disposed in the spaces, an unbroken liner supported by said surfaces within said rings beneath the shaft and adapted for rotation to a position above the shaft, the adjoining edges of the bearing surfaces and the liner being chamfered to permit the passage of the oil rings along the shaft between the liner and the surfaces after the liner has been rotated to the top of the shaft, the top part of the bearing being without a liner and having bearing surfaces engaging directly upon the shaft, the said liner being normally held in the bottom part of the bearing by engagement with the ends of the bearing surfaces of the top part.

6. A bearing comprising upper and lower sections, the lower section provided with spaced apart liner supports, oil rings in the spaces between the liner supports, a liner supported by said liner supports and movable from a position beneath to a position above the shaft to be supported, the said bearing being provided outside the length of the liner with a compartment to receive said oil rings, whereby when the liner is moved from beneath the shaft the oil rings may be moved into said compartment and the liner removed without disturbing the shaft.

7. A bearing comprising upper and lower sections, the lower section provided with spaced apart liner supports, oil rings in the spaces between said supports and a chamber beneath said supports constituting an oil well, a liner supported by said liner supports and movable from a position beneath to a position above the shaft to be supported, the said bearing being provided outside the length of the liner with a compartment to receive said oil rings, whereby when the liner is moved from beneath to above the shaft the oil rings may be moved into said compartment and the liner removed without disturbing the shaft.

8. A bearing comprising a journal box having in its lower portion spaced-apart liner supports, a liner supported by said supports, a shaft rotatable in said liner, oil rings in the spaces between said supports and surrounding the liner and the shaft, said liner being movable about the shaft from its normal position to permit the oil rings to be moved longitudinally of the shaft to allow the removal of the liner.

9. A bearing comprising a journal box, a plurality of transverse bearing surfaces in the lower portion of said box spaced apart throughout the entire length of the same, a continuous unbroken liner also extending throughout the entire length of the journal box adapted to be supported by said bearing surfaces, a shaft rotatable in said liner, and oil rings in the spaces between said bearing surfaces encircling said liner and said shaft, said liner being movable about said shaft from underneath the same to allow the oil ring to be moved longitudinally of the shaft and permit the withdrawal of the liner from said shaft.

In testimony whereof I have hereunto set my hand in presence of two subscribing witnesses.

JOSEPH L. HILLER.

Witnesses:
J. F. CULLIN,
JOHN PARKER.

Copies of this patent may be obtained for five cents each, by addressing the "Commissioner of Patents, Washington, D. C."